United States Patent
Stuyvenberg et al.

(10) Patent No.: US 10,164,320 B1
(45) Date of Patent: Dec. 25, 2018

(54) SYSTEM AND METHOD FOR SEALING POTTING MATERIAL FROM AN ANTENNA CAVITY

(71) Applicant: Badger Meter, Inc., Milwaukee, WI (US)

(72) Inventors: Matthew Stuyvenberg, Menomonee Falls, WI (US); Ryan Beverung, Germantown, WI (US); Jeremy Aderhold, Cedarburg, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 15/671,751

(22) Filed: Aug. 8, 2017

(51) Int. Cl.
*H01Q 1/22* (2006.01)
*G01D 4/00* (2006.01)

(52) U.S. Cl.
CPC ......... *H01Q 1/2208* (2013.01); *H01Q 1/2233* (2013.01); *G01D 4/004* (2013.01); *H01Q 1/2216* (2013.01); *H04Q 2209/60* (2013.01)

(58) Field of Classification Search
CPC .. H01Q 1/2208; H01Q 1/2216; H01Q 1/2225; H01Q 1/2233; G01D 4/002; G01D 4/004; G01D 4/0006
See application file for complete search history.

(56) References Cited

U.S. PATENT DOCUMENTS

| | | | | |
|---|---|---|---|---|
| 5,298,894 A | * | 3/1994 | Cerny | G01D 4/006 324/74 |
| 5,825,303 A | * | 10/1998 | Bloss, Jr. | H01Q 1/22 324/74 |
| 5,877,703 A | * | 3/1999 | Bloss, Jr. | G01D 4/004 340/870.02 |
| 6,072,405 A | * | 6/2000 | Sears | G01F 15/063 340/870.02 |
| 6,157,303 A | | 12/2000 | Bodie et al. | |
| 6,177,883 B1 | * | 1/2001 | Jennetti | G08C 17/02 340/870.02 |

(Continued)

FOREIGN PATENT DOCUMENTS

WO    2015101551 A1    7/2015

*Primary Examiner* — Duc M Nguyen
(74) *Attorney, Agent, or Firm* — Boyle Fredrickson, S.C.

(57) ABSTRACT

A transmitter assembly for transmitting data from a utility meter to a remote location for disposition in a subsurface utility enclosure is described. The assembly includes a printed circuit board, including a transmitter portion receiving the data from the utility meter and configured to generate a meter data message for transmission to the remote location, an antenna portion including a board mounted antenna receiving the generated meter data message and using the boarding mounted antenna to propagate the generated meter data message to a remote location, and a seal mount portion configured to receive a seal affixed to the printed circuit board. The transmitter assembly further includes a housing configured to receive the printed circuit board, a seal affixed to the printed circuit board at the seal mount portion, wherein the seal interacts with the housing to form a transmitter housing portion and an antenna housing portion, and a flowable material introduced to the housing, said flowable material filling the transmitter housing portion, wherein the seal prevents the flowable material from entering the antenna portion.

20 Claims, 7 Drawing Sheets

(56) References Cited

U.S. PATENT DOCUMENTS

| | | | | |
|---|---|---|---|---|
| 6,218,995 | B1* | 4/2001 | Higgins | G01D 4/002 340/870.02 |
| 6,300,907 | B1 | 10/2001 | Lazar et al. | |
| 6,414,605 | B1* | 7/2002 | Walden | G01D 4/008 340/870.02 |
| 8,009,108 | B2 | 8/2011 | Eisenbeis et al. | |
| 8,264,415 | B2 | 9/2012 | Winkler et al. | |
| 8,330,669 | B2 | 12/2012 | Cornwall et al. | |
| 8,481,626 | B1 | 7/2013 | Bhakta et al. | |
| 8,728,568 | B2 | 5/2014 | Bhakta et al. | |
| 2008/0272981 | A1* | 11/2008 | Gagne | H01Q 1/04 343/895 |
| 2010/0182204 | A1* | 7/2010 | Hao | H01Q 9/0421 343/702 |
| 2010/0259461 | A1* | 10/2010 | Eisenbeis | H01Q 1/002 343/873 |
| 2013/0015563 | A1* | 1/2013 | Lee | H01Q 1/2283 257/659 |
| 2014/0313050 | A1* | 10/2014 | Hamilton | G06F 12/145 340/870.02 |
| 2015/0379387 | A1* | 12/2015 | Richley | G06K 19/0702 235/492 |

* cited by examiner

SYSTEM AND METHOD FOR SEALING POTTING MATERIAL FROM AN ANTENNA CAVITY

FIELD OF THE INVENTION

This invention relates to automatic meter reading (AMR) systems for collecting meter data signals over a geographical area, such as a municipality or municipal utility district, and more particularly to antennae positioning and assembly for transmitter assemblies for location in subsurface enclosures installed in the ground.

BACKGROUND

In moderate climate zones, utility meters, particularly water meters, are located in subsurface ground enclosures in areas near residences or other dwellings. Such enclosures are referred to as "pits." In these systems, a transmitter or transceiver, and an associated antenna, are enclosed in one or more sealed enclosures which are located in a larger pit for the water meter. In exemplary embodiments of these subsurface ground enclosures, the antenna is disposed in an upper compartment and the electronics are installed in a lower compartment with a double seal between the two parts.

A primary issue concerning all remote meter systems, whether used in pit installations or elsewhere, is their resistance to weather, and to submersion in the event that the pit fills with water. Therefore, the invention provides a device that is very resistant to moisture conditions in its operating environment. Typically, the data storage device is powered by one or more batteries, which must also be contained in a sealed enclosure.

In another exemplary embodiment, a utility meter transmitter assembly has three vertically arranged compartments with a lowermost compartment receiving a flowable material, also known as a potting material, to seal some wire entry points. Potting material is typically injected through a port into the bottom compartment. A battery was encapsulated separately in a battery assembly that was inserted into a lower compartment from the bottom. In these embodiments, the housing for the electronics is provided by a tube and the encapsulating material is injected through a bottom opening to encapsulate the electronic circuit board and the battery. The embodiment may further include a bracket for mounting components, such as the electronic circuit board, in a subsurface ground enclosure.

The potting material, providing protection for the electronic circuit board and other components to provide improved field service life of the product in a submerged environment. However, encapsulating an antenna in the potting material has been shown to have a negative impact on the radiated performance. Accordingly, utility meter transmitter assemblies generally have all components except the antenna and matching circuit encapsulated in the potting material. Traditionally, to avoiding encapsulating the antenna, assemblies are configured to include multiple circuit board assemblies, one for the primary circuitry and the second for a board mount antenna. The two circuit board configurations typically include a wired connection between the boards, multiple mounting components, etc.

The present invention provides an improved system and method of encapsulation and an improved sealed transmitter assembly for installation in a subsurface ground enclosure. As with other electronic devices, there is a desire to make the devices less prone to failure, less expensive to manufacture, and easier to service in the field.

SUMMARY OF THE INVENTION

This invention provides a two-piece seal affixed to a printed circuit board between a transmitter portion and an antenna portion when the printed circuit board and seal are positioned within a housing to provide a seal between portions of the housing. Using the invention, a single printed circuit board may be utilized with a first portion of the printed circuit board is encapsulated in potting material and a second portion of the printed circuit board is not encapsulated.

In one more detailed aspect, a transmitter assembly for transmitting data from a utility meter to a remote location for disposition in a subsurface utility enclosure is described. The assembly includes a printed circuit board, including a transmitter portion receiving the data from the utility meter and configured to generate a meter data message for transmission to the remote location, an antenna portion including a board mounted antenna receiving the generated meter data message and using the board mounted antenna to propagate the generated meter data message to a remote location, and a seal mount portion configured to receive a seal affixed to the printed circuit board. The transmitter assembly further includes a housing configured to receive the printed circuit board, a seal affixed to the printed circuit board at the seal mount portion, wherein the seal interacts with the housing to form a transmitter housing portion and an antenna housing portion, and a flowable material introduced to the housing, said flowable material filling the transmitter housing portion, wherein the seal prevents the flowable material from entering the antenna portion.

In an exemplary embodiment, the housing is a cylindrical housing having a sealed portion and an open portion, and the printed circuit board including the seal is received such that the antenna portion is positioned in the sealed portion and the transmitter portion is positioned in the open portion. In this embodiment, a seal diameter correlates to a diameter of an interior cross-section of the cylinder. The seal may include a seal outer edge at a circumference of the seal, the seal outer edge forming a compression fit seal with an interior wall of the housing.

In another embodiment, the seal mount portion includes an aperture through the printed circuit board and the seal includes a seal mounting projection extending through the aperture to affix the seal to the printed circuit board at the seal mount portion. Additionally, or alternatively, the seal mount portion may include at least one edge cutout aperture along an edge of the printed circuit board and the seal includes at least one edge mounting projection positioned in the edge cutout aperture to affix the seal to the printed circuit board at the seal mount portion. The seal may be formed from a flexible thermoplastic material, a rigid plastic, or another material providing the advantages described herein.

In another embodiment, the seal is a two-piece seal, wherein a first seal portion interacts with a second seal portion to affix the seal to the printed circuit board such that the printed circuit board is between the first and second seal portions. The first seal portion may include a first seal attachment and a first seal mounting projection and the second seal portion includes a second seal attachment and the first seal attachment interacts with the second seal attachment to join the first seal portion to the second seal portion and the first seal mounting projection affixes the seal to the printed circuit board.

In another more detailed aspect, a transmitter assembly for transmitting data from a utility meter to a remote location for disposition in a subsurface utility enclosure includes a printed circuit board having a transmitter portion, receiving the data from the utility meter and generating a meter data message for transmission to the remote location, and an antenna portion including a board mounted antenna receiving the generated meter data message and using the board mounted antenna to propagate the generated meter data message to a remote location, the trasnmitted assembly. The transmitter assembly further includes a housing configured to receive the printed circuit board, a seal affixed to the printed circuit board, wherein the seal interacts with the housing and the printed circuit board to form a transmitter housing portion and an antenna housing portion, and a flowable material introduced to the housing, said flowable material filling the transmitter housing portion, wherein the seal prevents the flowable material from entering the antenna housing portion.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE INVENTION

Figure 1:
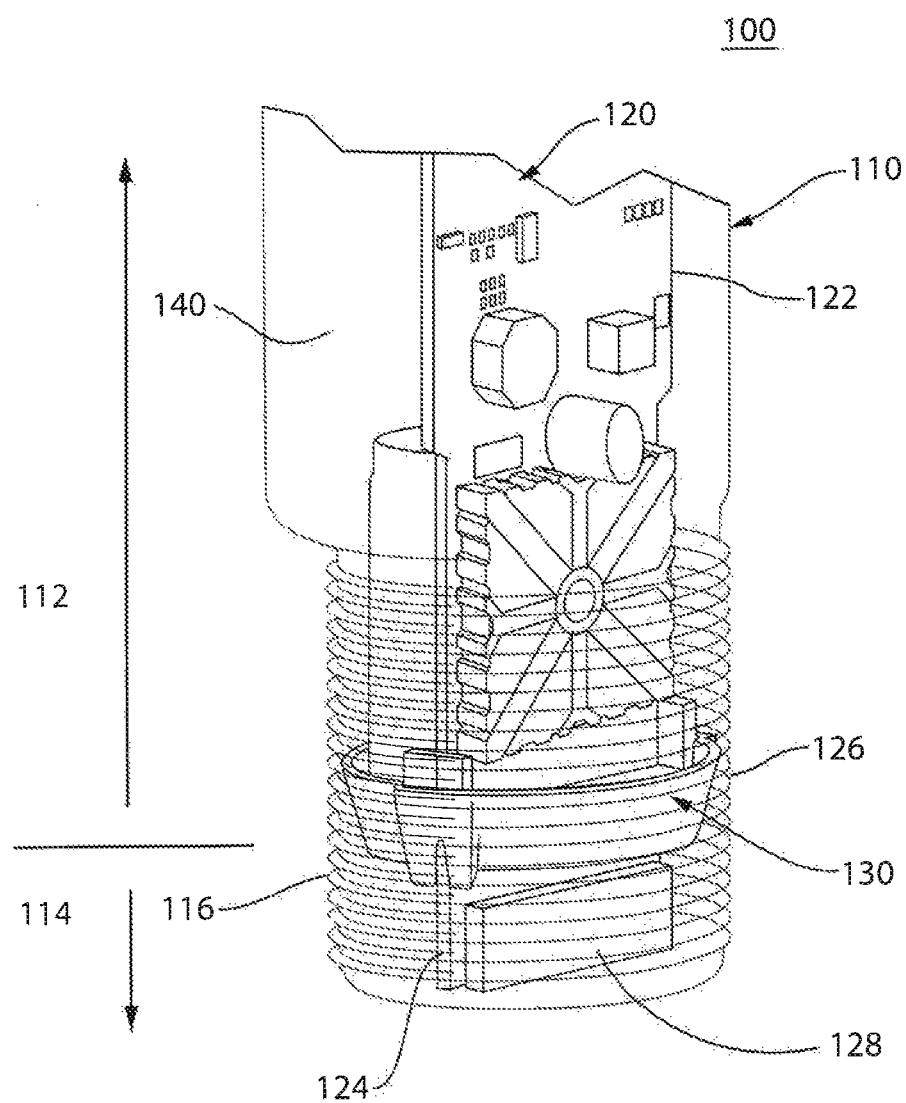
FIG. 1 is a perspective view of a portion of a transmitter assembly for transmitting data from a utility meter to a remote location for disposition in a subsurface utility enclosure, according to an exemplary embodiment.

Referring to FIG. 1, a portion of a transmitter assembly 100 for transmitting data from a utility meter to a remote location for disposition in a subsurface utility enclosure is shown, according to an exemplary embodiment. The transmitter assembly 100 of the present invention includes a housing 110 enclosing a printed circuit board 120 having a board mounted antenna 128 mounted thereon, and a seal 130 affixed to the printed circuit board 120.

Transmitter assembly 100 is configured to receive utility meter data from a utility meter (not shown) from transmittal to a remote location. The utility meter is configured to transmit meter data including a meter reading and transmitting radio frequency (RF) signals to a receiver at the remote location. The receiver may be a "gateway" that interfaces the transmitter assembly and another longer-range network. For example, the receiver may be provided with wireless capability to re-broadcast transmissions to a GSM cellular tower, a GSM network and/or the Internet. The utility meter may include additional sensors for sensing other types of conditions at the utility meter or in supply links connected to the utility meters.

The utility meters read meter data and certain alarm/condition status data from the meters. As used herein, the term "meter data" should be understood to include either utility consumption data or condition status data, or both. Condition status data includes leak detection data, tamper data and shut-off valve data and other types of data concerning meter operation besides actual utility consumption data.

Transmitter assembly 100 is configured to transmit data-encoded RF signals including the meter data in a meter data message. In one exemplary embodiment, the RF signals may be transmitted over low power RF frequencies either in the non FCC-licensed ISM (Industrial-Scientific-Medical) band from 902 MHz to 928 MHz or in the FCC-licensed frequencies such as 150-200 Mhz, 325 MHz, 433.92 MHz or from 450 to 470 MHz. In another embodiment, the RF signals may be transmitted over LTE frequency band from 1.4 MHz to 10 MHz. The transmitted meter data message may be sent to a utility management system including a database storing a history of readings. It should be mentioned here that many architectures are available for utility management systems using additional servers and other components and these are within the scope of the present invention.

Housing 110, shown as a cylindrical housing in FIG. 1, may be any shape, type or size of housing configured for enclosing printed circuit board 120 and seal 130. Housing 110 is configured for disposition in a subsurface utility enclosure such that the transmitter assembly 100 is positioned to maximize transmission quality for meter data messages. Housing 110 includes a threaded portion 116 configured to allow the housing 110 to be affixed to a pit lid of the subsurface utility enclosure.

Printed circuit board 120 includes a transmitter portion 122, an antenna portion 124, and a seal mount portion 126, the seal mount portion being underneath the seal 130 in FIG. 1. According to a preferred embodiment, printed circuit board 120 is a single circuit board including all of portions 122-126. The transmitter portion 122 includes transmitter circuitry receiving meter data through a wired or wireless transmitter/utility meter communication link. The antenna portion 124 includes a board mounted antenna 128 mounted to the printed circuit board 120. The board mounted antenna 128 may be any type of suitable antenna as is well known and understood by those skilled in the art. The seal mount portion 126 is the portion of the printed circuit board 120 between the transmitter portion 122 and the antenna portion 124.

Seal 130 is affixed to the printed circuit board 120 at the seal mount portion 126. Seal 130 is configured to form a watertight seal in housing 110 to define an antenna housing portion 114 of housing 110 including the antenna portion 124 of the printed circuit board 120 and a transmitter housing portion 112 including the transmitter portion 122 of the printed circuit board 120. Seal 130 is a two-piece seal configured to be joined such that the printed circuit board 120 passes through the seal 130. The seal 130 is described in further detail below with reference to FIGS. 2-5.

A flowable material 140 is disposed in the transmitter housing portion 112 to protect the transmitter portion 122 from moisture, known in the art as "potting". The flowable material 140 is disposed on both sides of the printed circuit board 120. The flowable material 140 is not disposed in the antenna portion 124 of the printed circuit board 120, so as not to affect the operation of the board mounted antenna 128 due to a capacitive effect that the material would have on the electrical properties of the board mounted antenna 128. Encapsulation of the transmitter portion 122 is necessary because the transmitter housing portion 112 is not water impervious. Antenna housing portion 114 of housing 110 is a substantially airtight unpotted portion within a sealed portion of the housing 110. Transmitter housing portion 112 of housing 110 is an open portion of the housing 110 allowing the flowable material 140 to be introduced into the housing 100, contained within the transmitter housing portion 112 by seal 130.

Figure 2:
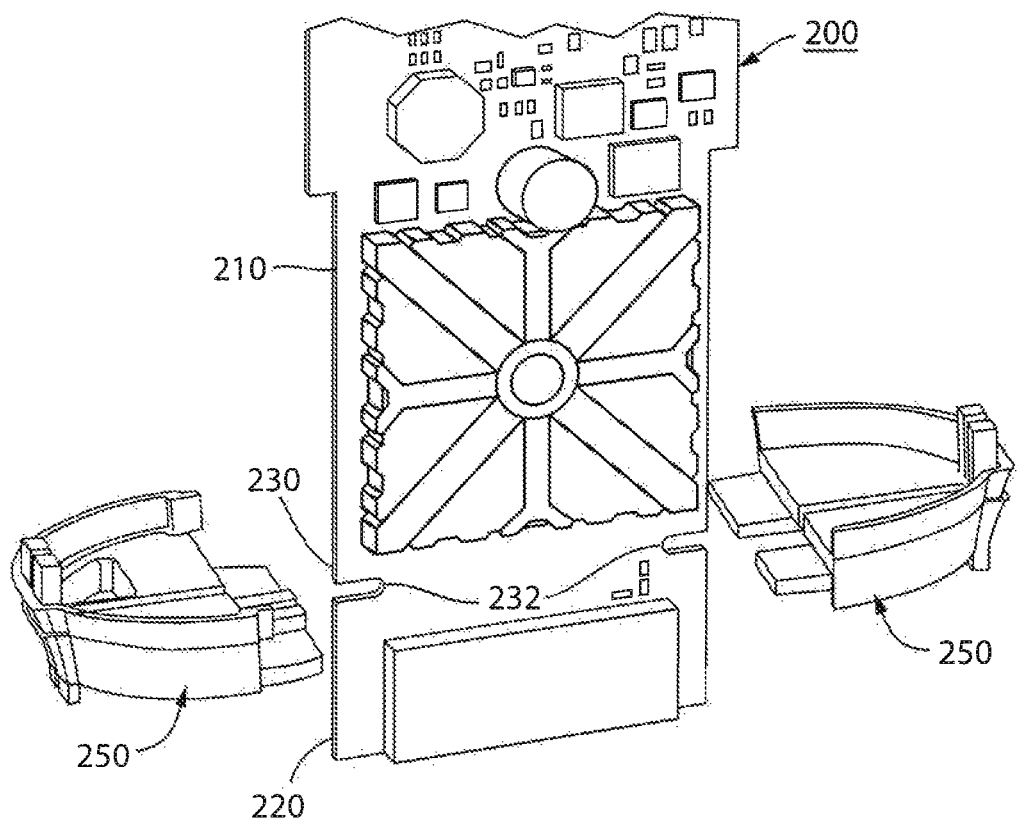
FIG. 2 is an exploded perspective view of the printed circuit board of the transmitter assembly of FIG. 1 and a seal configured to be affixed to the printed circuit board, according to an exemplary embodiment.

Referring now to FIG. 2, an exploded perspective view of a printed circuit board 200, an exemplary embodiment of the printed circuit board 120 of the transmitter assembly 100 shown in FIG. 1, and a seal 250, an exemplary embodiment of the seal 130 of FIG. 1, that is configured to be affixed to the printed circuit board 120 are shown, according to an exemplary embodiment. Printed circuit board 200 may be any type of circuit board configured as a single circuit board and including transmitter circuitry and a board mounted antenna.

Printed circuit board 200 includes a transmitter portion 210, an antenna portion 220, and a seal mount portion 230. Although portions 210-230 are shown with a specific sizing and configuration, one of ordinary skill in the art would recognize that the portions 210-230 may be any of a variety of sizing and configurations with seal mount portion 230 positioned between transmitter portion 210 and antenna portion 220 for the printed circuit board 200. Seal mount portion 230 is configured to receive the seal 250 such that seal 250 is affixed to the printed circuit board 200 at the seal mount portion 230.

Figure 3A:
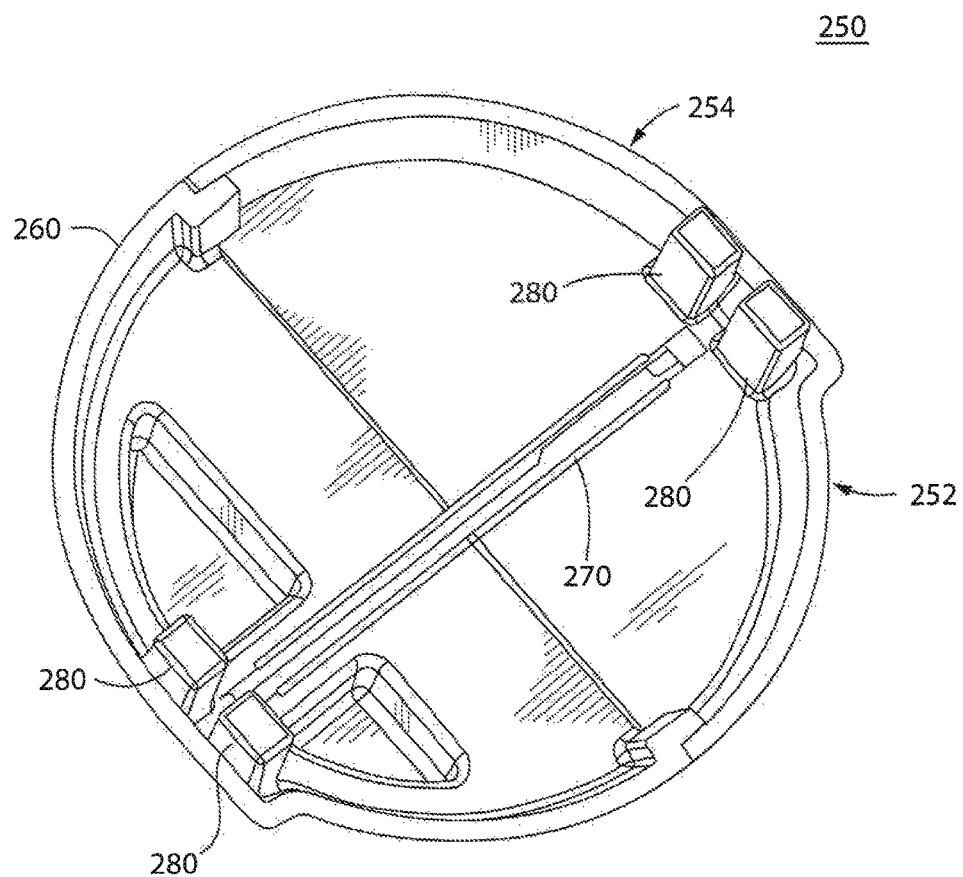
FIG. 3A is a perspective view of the seal of FIG. 2 in a joined configuration and shown without the printed circuit board, according to an exemplary embodiment.
Figure 3B:
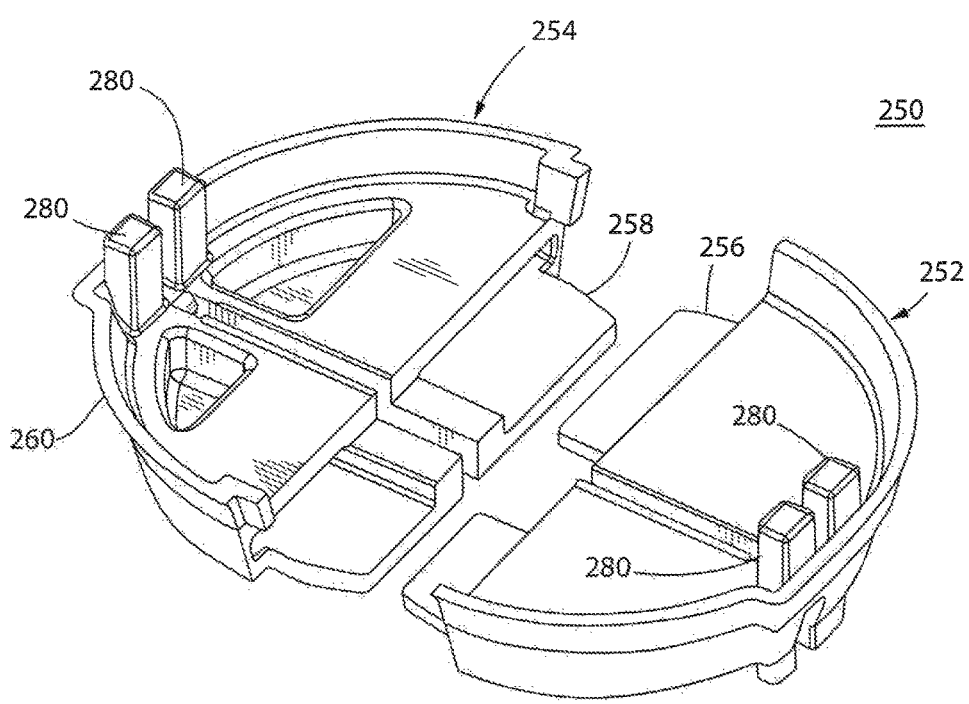
FIG. 3B is a perspective view of the seal of FIG. 2 in a separated configuration and shown without the printed circuit board, according to an exemplary embodiment.

Referring now also to FIGS. 3A and 3B, seal 250 is shown according to an exemplary embodiment in FIG. 3A in a joined configuration, with the printed circuit board 200 removed for illustration, and in FIG. 3B in a separated configuration. Although seal 250 is shown with a specific sizing and configuration and including particular features, one of ordinary skill in the art would recognize that the seal 250 may be any of a variety of sizing and configurations and include a variety of features to provide the seal functionality described herein. For example, although seal 250 is shown and described herein as being circular, seal 250 may be configured in any shape to match the shape of a cross section between interior walls of a housing 100 that has any shape.

Seal 250 may be formed from any of a variety of materials, preferably selected to maximize the seal formed by seal 250 between the transmitter housing portion 112 and the antenna housing portion 114, such as a plastic material, a thermoplastic material, a thermoplastic elastomer, a combination of materials, etc. Seal 250 may further be configured to be rigid, flexible or include different portion that are rigid or flexible.

Seal 250 includes a first seal portion 252 and second seal portion 252, configured as separated pieces that sandwich the printed circuit board 200 when the seal portions are in a joined configuration. The first seal portion 252 includes a first seal attachment 256 and the second seal portion 254 includes a second seal attachment 258. The first seal attachment 256 is configured to interact with the second seal attachment 258 to join the first seal portion 252 to the second seal portion 254. The seal attachments 256,258 may be configured to receive and/or extend into the seal portions 252, 254 to maximize the strength of the attachment and the seal formed by seal 250 in the joined configuration. The seal attachments 256,258 may be configured to be locking attachments to secure the first seal portion 252 to the second seal portion 254 to form a watertight seal. Alternatively, the first seal portion 252 may be secured to the second seal portion 254 by a compression fit between the seal 250 and the housing 110 and the seal attachments 256,258 provide support against displacement caused by a force axial to the diameter of the seal 250.

Seal 250 may be formed to include a seal outer edge 260 formed at an outer circumference of the seal 250. Seal 250 may further be formed such that a diameter of the seal 250 is essentially the same as a diameter between interior walls of the housing 110. The seal outer edge 260 may be configured to extend axially from the diameter of the seal 250 such that the seal outer edge 260 will extend along the interior wall of the housing 110. The seal outer edge 260 may be configured to extend outward from the outer circumference of the seal 250 such that the seal outer edge 260 forms a compression fit seal between the seal 250 and the interior wall of the housing 110.

Seal 250 is configured to define a printed circuit board aperture 270 when the seal 250 is in the joined configuration to allow the printed circuit board 200 to pass through the seal 250. According to a preferred embodiment, the length of the printed circuit board aperture 270 is less than the diameter of the seal 250 such that a portion of the seal 250 will extend around the edges of the printed circuit board 200. The printed circuit board aperture 270 is configured such that a watertight seal is formed between the printed circuit board 200 and the seal 250 in the joined configuration.

Referring again to the printed circuit board 200, seal mount portion 230 may be configured to include first and second edge cutout apertures 232 extending inward from the edges of the printed circuit board 200. Printed circuit board aperture 260 may be configured such that the length of the aperture corresponds to the distance between the inward extensions of the first and second edge cutout apertures 232. Accordingly, the seal 250 will extend into the first and second edge cutout apertures 232 of the printed circuit board 200 and be affixed to the printed circuit board 200 at the seal mount portion 130.

Seal 250 may further be configured to include one or more printed circuit board support extensions 280 extending in a direction axial to the diameter of the seal 250. Support extensions 280 are configured such that when the printed circuit board 200 is affixed to the seal 250 and positioned within the housing 110, the support extensions will extend along the printed circuit board 200 to support and position the printed circuit board 200 such that a centerline of the printed circuit board 200 substantially correlates with an axis of the housing 110. As will be appreciated by one of ordinary skill in the art, the seal 250 and support extensions 280 may be configured to position the printed circuit board 200 in a variety of positions relative to the housing 110.

Figure 4:
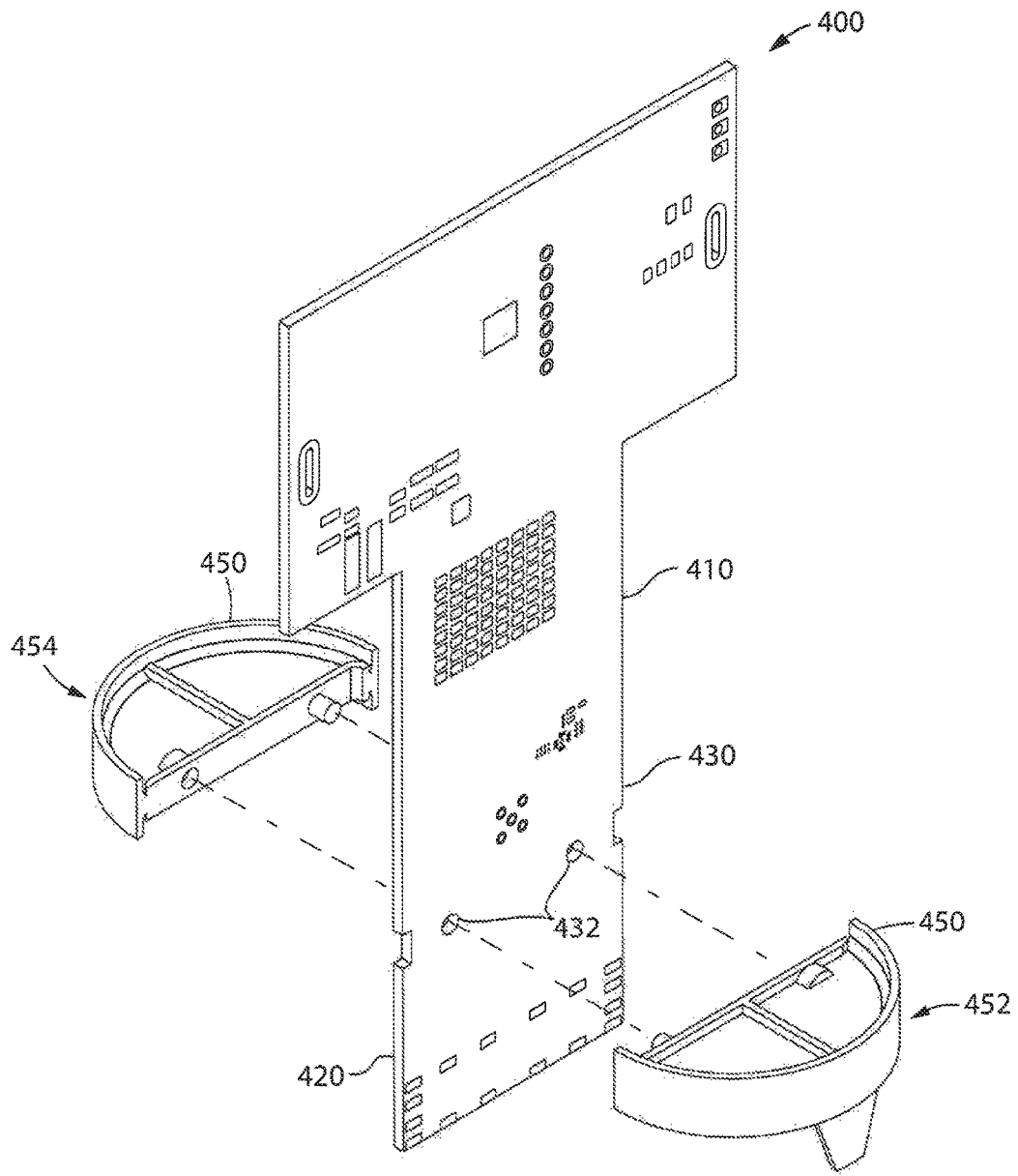
FIG. 4 is an exploded perspective view of the printed circuit board of the transmitter assembly of FIG. 1 and a seal configured to be affixed to the printed circuit board, according to an alternative embodiment.

Referring now to FIG. 4, an exploded perspective view of a printed circuit board 400, an exemplary embodiment of the printed circuit board 120 of the transmitter assembly 100 shown in FIG. 1, and a seal 450, an exemplary embodiment of the seal 130 of FIG. 1, that is configured to be affixed to the printed circuit board 120 are shown, according to an exemplary embodiment. Printed circuit board 400 is similar to the printed circuit board 200 and includes a transmitter portion 410, an antenna portion 420, and a seal mount portion 430, similar to those components described therewith.

Figure 5A:
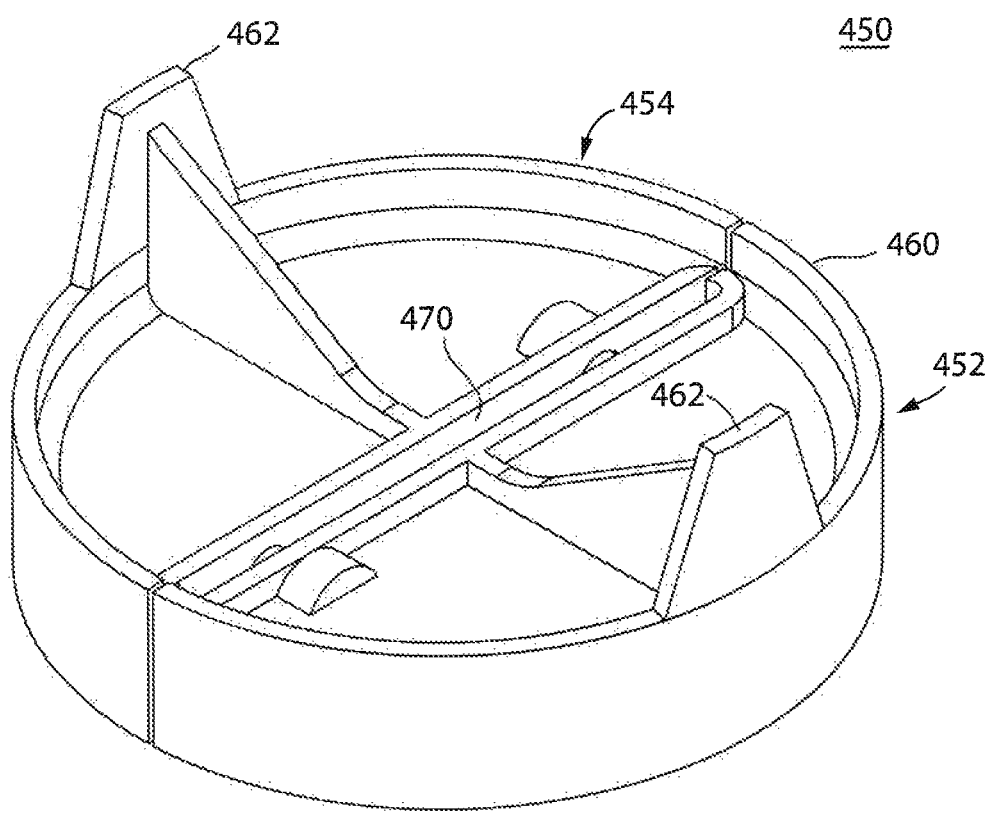
FIG. 5A is a perspective view of the seal of FIG. 4 in a joined configuration and shown without the printed circuit board, according to an exemplary embodiment.
Figure 5B:
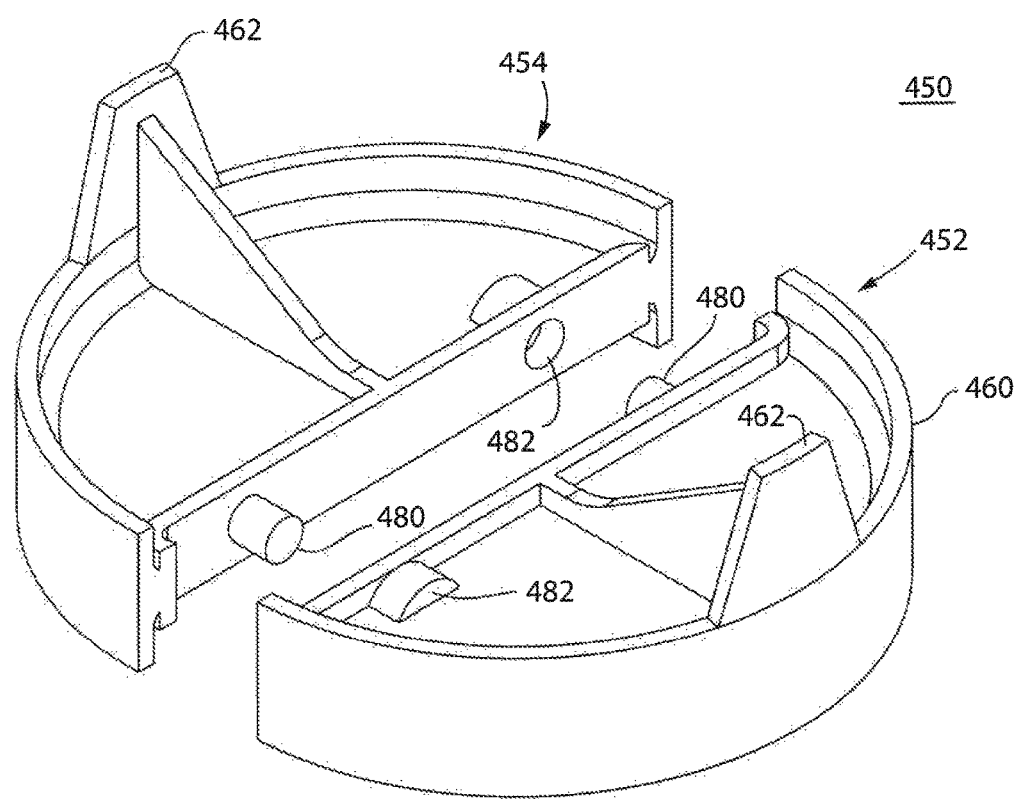
FIG. 5B is a perspective view of the seal of FIG. 4 in a separated configuration and shown without the printed circuit board, according to an exemplary embodiment.

Referring now also to FIGS. 5A and 5B, seal 450 is shown according to an exemplary embodiment in FIG. 5A in a joined configuration, with the printed circuit board 400 removed for illustration, and in FIG. 5B in a separated configuration. Seal 450 may be formed and configured similar to seal 250 as described in detail above, except as described below.

Seal 450 may be formed to include a seal outer edge 460 formed at an outer circumference of the seal 450 similar to the seal outer edge 252 described above. Seal outer edge 460 may be configured to include outer edge projections 462 extending further along the interior wall of the housing 110 than the seal outer edge 460. Projections 462 may be configured to mate with a corresponding chevron (not shown) to orient the board assembly in the housing 110. Projections 462 further apply a resistive force to prevent the seal 450 from tilting out of alignment during assembly.

Seal 450 is also configured to define a printed circuit board aperture 470 when the seal 450 is in the joined configuration to allow the printed circuit board 400 to pass through the seal 450. The length of the printed circuit board aperture 470 is roughly the same as the length between edges of the printed circuit board 400 but less than the diameter of the seal 450 such that a portion of the seal 450 will extend around the edges of the printed circuit board 400. The printed circuit board aperture 470 is configured such that a watertight seal is formed between the printed circuit board 400 and the seal 450 in the joined configuration.

Seal 450 includes a first seal portion 452 and second seal portion 454, configured as separated pieces that sandwich the printed circuit board 400 when the seal portions are in a joined configuration. The first seal portion 452 may be secured to the second seal portion 454 by a compression fit between the seal 450 and the housing 110.

Referring again to the printed circuit board 400, seal mount portion 430 is configured to include one or more printed circuit board apertures 432 extending through the printed circuit board in a direction axial to the length between the edges of the printed circuit board 400. The aperture(s) 432 may be location in position(s) displaced from the edges of the printed circuit board 400 along the length between the edges of the printed circuit board 400. First seal portion 452 and second seal portion 452 may be configured to include one or more seal mounting projections 480 configured to extended into a seal mounting receiver 482 of the other of first seal portion 452 and second seal portion 452 through a printed circuit board aperture 432. Accordingly, the seal mounting projection(s) 480, printed circuit board aperture(s) 432 and seal mounting receiver(s) 482 cooperate to affix the seal 450 to the printed circuit board 400 within the seal mount portion 430.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A transmitter assembly for transmitting data from a utility meter to a remote location for disposition in a subsurface utility enclosure, comprising:
    a printed circuit board, including
        a transmitter portion receiving the data from the utility meter and configured to generate a meter data message for transmission to the remote location,
        an antenna portion including a board mounted antenna receiving the generated meter data message and using the board mounted antenna to propagate the generated meter data message to a remote location, and
        a seal mount portion configured to receive a seal affixed to the printed circuit board;
    a housing configured to receive the printed circuit board;
    a seal affixed to the printed circuit board at the seal mount portion prior to insertion of the printed circuit board into the housing, wherein the seal interacts with the housing to form a transmitter housing portion and an antenna housing portion; and
    a flowable material introduced to the housing, said flowable material filling the transmitter housing portion, wherein the seal prevents the flowable material from entering the antenna housing portion.

2. The transmitter assembly of claim 1, wherein the housing is a cylindrical housing having a sealed portion and an open portion, and the printed circuit board including the seal is received such that the antenna portion is positioned in the sealed portion and the transmitter portion is positioned in the open portion.

3. The transmitter assembly of claim 2, wherein a seal diameter correlates to a diameter of an interior cross-section of the cylinder.

4. The transmitter assembly of claim 3, wherein the seal includes a seal outer edge at a circumference of the seal, the seal outer edge forming a compression fit seal with an interior wall of the housing.

5. The transmitter assembly of claim 1, wherein the seal mount portion includes an aperture through the printed circuit board and the seal includes a seal mounting projection extending through the aperture to affix the seal to the printed circuit board at the seal mount portion.

6. The transmitter assembly of claim 1, wherein the seal mount portion includes at least one edge cutout aperture along an edge of the printed circuit board and the seal includes at least one edge mounting projection positioned in the edge cutout aperture to affix the seal to the printed circuit board at the seal mount portion.

7. The transmitter assembly of claim 1, wherein the seal is a two-piece seal, wherein a first seal portion interacts with a second seal portion to affix the seal to the printed circuit board such that the printed circuit board is between the first and second seal portions.

8. The transmitter assembly of claim 7, wherein the first seal portion includes a first seal attachment and a first seal mounting projection and the second seal portion includes a second seal attachment and the first seal attachment interacts with the second seal attachment to join the first seal portion to the second seal portion and the first seal mounting projection affixes the seal to the printed circuit board.

9. The transmitter assembly of claim 1, wherein the seal is formed from a flexible thermoplastic material.

10. The transmitter assembly of claim 1, wherein the seal is formed from a rigid plastic.

11. A transmitter assembly for transmitting data from a utility meter to a remote location for disposition in a subsurface utility enclosure, the transmitter assembly including a printed circuit board having a transmitter portion, receiving the data from the utility meter and generating a meter data message for transmission to the remote location, and an antenna portion including a board mounted antenna receiving the generated meter data message and using the board mounted antenna to propagate the generated meter data message to a remote location, the trasnmitted assembly comprising:

a housing configured to receive the printed circuit board;

a seal affixed to the printed circuit board prior to insertion of the printed circuit board into the housing, wherein the seal interacts with the housing and the printed circuit board to form a transmitter housing portion and an antenna housing portion; and a flowable material introduced to the housing, said flowable material filling the transmitter housing portion, wherein the seal prevents the flowable material from entering the antenna housing portion.

12. The transmitter assembly of claim 11, wherein the housing is a cylindrical housing having a sealed portion and an open portion, and the printed circuit board including the seal is received such that the antenna portion is positioned in the sealed portion and the transmitter portion is positioned in the open portion.

13. The transmitter assembly of claim 12, wherein a seal diameter correlates to a diameter of an interior cross-section of the cylinder.

14. The transmitter assembly of claim 13, wherein the seal includes a seal outer edge at a circumference of the seal, the seal outer edge forming a compression fit seal with an interior wall of the housing.

15. The transmitter assembly of claim 11, wherein the seal extends through an aperture through the printed circuit board and the seal to affix the seal to the printed circuit board at a seal mount portion.

16. The transmitter assembly of claim 11, wherein the seal mount portion includes at least one edge cutout aperture along an edge of the printed circuit board and the seal includes at least one edge mounting projection positioned in the edge cutout aperture to affix the seal to the printed circuit board at the seal mount portion.

17. The transmitter assembly of claim 11, wherein the seal is a two-piece seal, wherein a first seal portion interacts with a second seal portion to affix the seal to the printed circuit board such that the printed circuit board is between the first and second seal portions.

18. The transmitter assembly of claim 17, wherein the first seal portion includes a first seal attachment and a first seal mounting projection and the second seal portion includes a second seal attachment and the first seal attachment interacts with the second seal attachment to join the first seal portion to the second seal portion and the first seal mounting projection affixes the seal to the printed circuit board.

19. The transmitter assembly of claim 11, wherein the seal is formed from a flexible thermoplastic material.

20. The transmitter assembly of claim 11, wherein the seal is formed from a rigid plastic.

* * * * *